(12) United States Patent
Boyko et al.

US007047408B1

(10) Patent No.: US 7,047,408 B1
(45) Date of Patent: May 16, 2006

(54) SECURE MUTUAL NETWORK AUTHENTICATION AND KEY EXCHANGE PROTOCOL

(75) Inventors: Victor Vladimir Boyko, Monsey, NY (US); Eric Grosse, Berkeley Heights, NJ (US); Philip Douglas MacKenzie, Maplewood, NJ (US); Sarvar Patel, Montville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 938 days.

(21) Appl. No.: 09/638,320

(22) Filed: Aug. 14, 2000

Related U.S. Application Data

(60) Provisional application No. 60/190,318, filed on Mar. 17, 2000.

(51) Int. Cl.
 *H04L 9/32* (2006.01)
 *H04L 9/28* (2006.01)
(52) U.S. Cl. ......................................... 713/169; 380/28
(58) Field of Classification Search ................ 713/169, 713/171, 150, 168, 189, 193; 380/28, 44, 380/277
 See application file for complete search history.

(56) References Cited

U.S. PATENT DOCUMENTS

| | | | | |
|---|---|---|---|---|
| 4,956,863 | A * | 9/1990 | Goss | 380/30 |
| 5,241,599 | A | 8/1993 | Bellovin et al. | 380/21 |
| 5,351,293 | A * | 9/1994 | Michener et al. | 713/171 |
| 5,440,635 | A | 8/1995 | Bellovin et al. | 380/25 |
| 5,450,493 | A * | 9/1995 | Maher | 380/30 |
| 5,602,917 | A * | 2/1997 | Mueller | 380/284 |
| 6,028,937 | A * | 2/2000 | Tatebayashi et al. | 713/169 |
| 6,226,383 | B1 * | 5/2001 | Jablon | 380/30 |
| 6,539,479 | B1 * | 3/2003 | Wu | 713/151 |

FOREIGN PATENT DOCUMENTS

EP 0 977 396 A 2/2000

OTHER PUBLICATIONS

Li Gong, T. Mark A. Lomas, Roger M. Needham, Jerome H. Saltzer, Protecting Poorly Chosen Secrets from Guessing Attacks (1993) IEEE Journal on Selected Areas in Communications.*

(Continued)

*Primary Examiner*—Christopher Revak
(74) *Attorney, Agent, or Firm*—Jeffrey M. Weinick; Donald P. Dinella (57) ABSTRACT

Secure communication protocols are disclosed in which two parties generate a shared secret which may be used as a secure session key for communication between the parties. The protocols are based on Diffie-Hellman type key exchange in which a Diffie-Hellman value is combined with a function of at least a password using the group operation such that the Diffie-Hellman value may be extracted by the other party using the inverse group operation and knowledge of the password. In one embodiment, each of the parties explicitly authenticates the other party, while in another embodiment, the parties utilize implicit authentication relying on the generation of an appropriate secret session key to provide the implicit authentication. Typically, the parties will be a client computer and a server computer. In accordance with other embodiments of the invention, in order to protect against a security compromise at the server, the server is not in possession of the password, but instead is provided with, and stores, a so-called password verifier which is a function of the password and where the password itself cannot be determined from the value of the password verifier.

33 Claims, 5 Drawing Sheets

OTHER PUBLICATIONS

Schneier, Bruce, Applied Cryptography 1996 John Wiley & Sons, 2nd Edition.*

H. Dobbertin, A Bosselaers and B. Preneel, "RIPEMID-160: A Strengthened Version of RIPEMD", *Fast Software Encryption, LNCS 1039, Springer-Verlag,* 1996, pp. 71-82.

"Secure Hash Standard", Federal Information Processing Standards Publication (Supersedes FIPS PUB 180 -May 11, 1993), U.S. Department of Commerce, Technology Administration, National Institute of Standards and Technology, Issued Apr. 17, 1995.

W. Diffie and M.E. Hellman, "New Directions in Cryptography", *IEEE Transactions On Information Theory* vol. IT-22, No. 6, Nov. 1976, pp. 644-654.

R.L. Rivest, A Shamir and L. Adleman, "A Method for Obtaining Digital Signatures and Public-Key Cryptosystems", *Communications of the ACM,* Feb. 1978, vol. 21, No. 2, pp. 120-126.

S. Patel, "Number Theoretic Attacks on Secure Password Schemes", *Proceedings of the IEEE Symposium on Research in Security and Privacy,* pp. 236-247, 1997.

S. Lucks, "Open Key Exchange: How to Defeat Dictionary Attacks Without Encrypting Public Keys", Security Protocol Workshop, Ecole Normale Sup'erieure, Apr. 7-9, 1997.

T. Wu, "The Secure Remote Password Protocol", *Proceedings of the 1998 Internet Society Network and Distributed System Security Symposium,* pp. 97-111, 1998.

M. Steiner, G. Tsudik, and M. Waidner, "Refinement and Extension of Encrypted Key Exchange", *ACM Operating System Review,* 29:22-20, 1995.

S.M. Bellovin and M. Merritt, "Augmented Encrypted Key Exchange: A Password-Based Protocol Secure Against Dictionary Attacks and Password File Compromise", *Proceedings of the First Annual Conference on Computer and Communications Security,* 1993, pp. 244-250.

S. M. Bellovin and M. Merritt, "Encrypted Key Exchange: Password-Based Protocols Secure Against Dictionary Attacks", *Proceedings of the IEEE Symposium on Research in Security and Privacy,* Oakland, May 1992.

D.P. Jablon, "Strong Password-Only Authenticated Key Exchange", *ACM Computer Communications Review, ACM SIGCOM,* 26(5):5-20, 1996.

M. Bellare, D. Pointcheval and P. Rogaway, "Authenticated Key Exchange Secure Against Dictionary Attacks", *Proceedings of Eurocrypt,* pp. 139-155, 2000.

D. Jablon, "Extended Password Key Exchange Protocols Immune To Dictionary Attack", *WETICE Workshop on Enterprise Security,* pp. 1-8, 1997.

Jablon, D P: "Strong Password-Only Authenticated Key Exchange" Computer Communications Review, US, Association for Computing Machinery, New York, vol. 26, No. 5, Oct. 1, 1996, pp. 5-26, XP000641968, ISSN: 0146-4833 * p. 19, line 1-line 14.

European Search Report dated Jul. 3, 2001 for Application 00309331.7-1237.

* cited by examiner

SECURE MUTUAL NETWORK AUTHENTICATION AND KEY EXCHANGE PROTOCOL

CROSS-REFERENCE TO RELATED APPLICATION

This application claims the benefit of U.S. Provisional Application Ser. No. 60/190,318, filed Mar. 17, 2000.

FIELD OF THE INVENTION

The present invention relates generally to network authentication and key exchange. More particularly, the present invention relates to a password-only secure mutual network authentication and key exchange protocol.

BACKGROUND OF THE INVENTION

Authentication over a network is an important part of security for systems that allow remote clients to access network servers. Authentication is generally accomplished by verifying one or more of the following:
something a user knows, e.g. a password;
something a user is, i.e., biometric information, such as a fingerprint; and
something a user has, i.e., some identification token, such as a smart-card.

For example, an automatic teller machine (ATM) verifies two of these: something a user has, the ATM card, and something a user knows, a personal identification number (PIN). ATM authentication is significantly easier than authentication over a data network because the ATM itself is considered trusted hardware, such that it is trusted to verify the presence of the ATM card and to transfer the correct information securely to a central transaction server.

In addition to authentication, key exchange is an important part of communication across a data network. Once a client and server have been authenticated, a secure communication channel must be set up between them. This is generally accomplished by the client and server exchanging a key, called a session key, for use during communication subsequent to authentication.

Authentication over a data network, especially a public data network like the Internet, is difficult because the communication between the client and server is susceptible to many different types of attacks. For example, in an eavesdropping attack, an adversary may learn secret information by intercepting communication between the client and the server. If the adversary learns password information, the adversary may replay that information to the server to impersonate the legitimate client in what is called a replay attack. Replay attacks are effective even if the password sent from the client is encrypted because the adversary does not need to know the actual password, but instead must provide something to the server that the server expects from the legitimate client (in this case, an encrypted password). Another type of attack is a spoofing attack, in which an adversary impersonates the server, so that the client believes that it is communicating with the legitimate server, but instead is actually communicating with the adversary. In such an attack, the client may provide sensitive information to the adversary.

Further, in any password based authentication protocol, there exists the possibility that passwords will be weak such that they are susceptible to dictionary attacks. A dictionary attack is a brute force attack on a password that is performed by testing a large number of likely passwords (e.g. all the words in an English dictionary) against some known information about the desired password. The known information may be publicly available or may have been obtained by the adversary through one of the above described techniques. Dictionary attacks are often effective because users often choose easily remembered, and easily guessed, passwords.

There are various known techniques for network authentication. These known techniques will be divided into two classifications. The first classification includes those techniques that require persistent stored data on the client system. The second classification includes those techniques which do not require persistent stored data on the client system.

With respect to the first classification, persistent stored data may include either secret data (e.g. secret keys shared with the authenticating server) which must never be revealed, or non-secret but sensitive data (e.g. the authenticating server's public key) which must be tamper-proof. With either type of persistent data, extra security requirements are necessary to secure the data from attack from an adversary. Further, when using an authentication protocol which relies on both passwords and persistent stored data, a compromise of either may lead to a vulnerability of the other. For example, compromising a secret key may lead to a possible dictionary attack on the password. Another problem with this first class of protocols is that persistent stored data requires generation and distribution of keys, which can be cumbersome, and generally provides a less flexible system.

The second classification is called password-only authentication protocols because there is no requirement of persistent stored data at the client. The client only needs to be able to provide a legitimate password. The notion of providing strong security and authentication using potentially weak passwords seems to be contradictory. However, there exist several password-only user authentication and key exchange protocols that are designed to be secure. A description of these protocols may be found in D. Jablon, *Strong Password-Only Authenticated Key Exchange*, ACM Computer Communication Review, ACM SIGCOMM, 26(5): 5–20, 1996. Some of the more notable of these password-only protocols includes Encrypted Key Exchange (EKE) described in S. M. Bellovin and M. Merritt, *Encrypted Key Exchange: Password-Based Protocols Secure Against Dictionary Attacks*, Proceedings of the IEEE Symposium on Research in Security and Privacy, pp. 72–84, 1992; Augmented-EKE (A-EKE), S. M. Bellovin and M. Merritt, *Augmented Encrypted Key Exchange: A Password-Based Protocol Secure Against Dictionary Attacks and Password File Compromise*, Proceedings of the First Annual Conference on Computer and Communications Security, 1993, pages 244–250; Modified EKE (M-EKE), M. Steiner, G. Tsudik, and M. Waidner, *Refinement and Extension of Encrypted Key Exchange*, ACM Operating System Review, 29:22–30, 1995; Simple Password EKE (SPEKE) and Diffie-Hellman EKE (DH-EKE), both described in D. Jablon, *Strong Password-Only Authenticated Key Exchange*, ACM Computer Communication Review, ACM SIGCOMM, 26(5):5–20, 1996; Secure Remote Password Protocol (SRP), T. Wu, *The Secure Remote Password Protocol*, Proceedings of the 1998 Internet Society Network and Distributed System Security Symposium, pages 97–111, 1998; and Open Key Exchange (OKE), Stefan Lucks, *Open Key Exchange:*

*How to Defeat Dictionary Attacks Without Encrypting Public Keys*, Security Protocol Workshop, Ecole Normale Sup'erieure, Apr. 7–9, 1997.

The problem with these known password-only authentication protocols is that they have not been proven secure. In fact, the EKE protocol may be susceptible to certain number theoretic attacks as described in S. Patel, *Number Theoretic Attacks on Secure Password Schemes*, Proceedings of the IEEE Symposium on Research in Security and Privacy, pages 236–247, 1997. In view of the importance of network security, there is a need for a password-only mutual authentication protocol which is provably secure.

Commonly assigned U.S. patent application Ser. No. 09/353,468 entitled Secure Mutual Network Authentication Protocol, filed Jul. 13, 1999, discloses a secure password-only mutual network authentication protocol utilizing a public key encryption scheme. That protocol has been proven as secure as the underlying public key encryption scheme.

SUMMARY OF THE INVENTION

The present invention provides a secure password-only mutual network authentication protocol which is provably secure. In accordance with the inventive protocol, two parties generate a shared secret using a Diffie-Hellman type key exchange. As will be described in further detail below, in accordance with a Diffie-Hellman type key exchange, there is a group generator g for the particular so-called group, an index x known to one party, an index y known to the other party, and the shared secret $g^{xy}$. One party generates $g^x$, the other party generates $g^y$, and the parties exchange these values so that each party may now generate the shared secret $g^{xy}$. While Diffie-Hellman defines a key exchange protocol, the protocol has no authentication aspects.

In accordance with the present invention, we provide a protocol which uses a Diffie-Hellman type shared secret, but modified such that the two parties may authenticate each other using a shared password. Further, and importantly, we have proven that this protocol is secure. In accordance with the invention, a party generates the Diffie-Hellman value $g^x$ and combines it with a function of at least the password using the so-called group operation, and transmits the resulting value to the other party. The group operation is defined for the particular group being used, and will be described in further detail below. For present purposes, it is sufficient to recognize that every group has a group operation and a corresponding inverse group operation. Upon receipt of the value, the other party performs the inverse group operation on the received value and the function of at least the password to extract $g^x$ such that the other party may then generate the shared secret $g^{xy}$ using its knowledge of y. The use of the group operation and the inverse group operation in conjunction with a Diffie-Hellman type key exchange protocol as described herein provides benefits over the prior art password-only mutual network authentication protocols. Perhaps most importantly, it provides a protocol which can be proven to be secure against attacks by adversaries which have access to the communication channel. As described above, the Diffie-Hellman value $g^x$ is combined with a function of at least the password. The term "at least" is used because, in various embodiments, $g^x$ may be combined with a function of the password alone, or a function of the password along with identifiers of the parties to the protocol in order to ensure that the password is unique for any particular pair of parties.

In accordance with one embodiment of the invention, the parties may authenticate each other by computing a function of at least certain parameters, transmitting the computed value to the other party, and then each party checking the received value against its own computed value. The parameters used for the computation may be at least one of a party identifier, the Diffie-Hellman value ($g^x$ or $g^y$), the shared secret, and the shared password. By computing a function of at least one of these values, the parties may authenticate that the other party is in possession of the shared password.

In accordance with another embodiment of the invention, the parties do not explicitly authenticate each other, but instead the parties implicitly authenticate each other by each generating the shared secret key and using that generated shared secret key as a session key for communication. If either party is not in possession of the correct password, then that party would not be able to generate the correct secret session key and communication between the parties would not be possible. In accordance with this embodiment, both parties use the above described technique of combining their Diffie-Hellman values with a function of at least the password using the group operation and transmitting the resulting value to the other party. Upon receipt of the value from the other party, each party extracts the other party's Diffie-Hellman value using the inverse group operation, and then computes the shared secret key.

The two parties to the communication protocol will most often be a client computer and a server computer. In the above described embodiments, the client and server both store the shared password. In other embodiments of the invention, in order to protect against a security compromise at the server, the server is not in possession of the password, but instead is provided with, and stores, a so-called password verifier which, as described in further detail below, is a function of the password. The password itself cannot be determined from knowledge of the password verifier. The protocols in accordance with these embodiments of the invention are similar to the embodiments described above, except the password verifier is generally used in place of the actual password. However, since the server does not know the actual password, different techniques must be used by the two parties in order for each party to securely authenticate that the other party is actually in possession of the correct password verifier or actual password. In one embodiment, the parties authenticate each other using encryption based on the El Gamal encryption technique.

These and other advantages of the invention will be apparent to those of ordinary skill in the art by reference to the following detailed description and the accompanying drawings.

DETAILED DESCRIPTION

Cryptography is a well known technique for providing secure communication between two parties. Prior to describing the various embodiments of the present invention, some background and basic terminology will be provided.

Informally, a function $f$ from a set S to a set T is a one-way function if $f(x)$ is easy to compute for all x in S but for most y in T, it is computationally infeasible to find any x in S where $f(x)=y$. One example of a one-way function is modular exponentiation. Let p be a large prime and g a generator of the multiplicative group mod p (that is, the numbers in the range 1, . . . , p−1). Then $f(x)=g^x$ mod p is generally assumed to be a one-way function. The inverse function, called the discrete log function, is difficult to compute. There are also other groups in which the discrete log function is difficult to compute, such as certain elliptic curve groups.

Let k and l denote security parameters, where k is the main security parameter and can be thought of as a general security parameter for hash functions and secret keys, and l>k can be through of as a security parameter for discrete-log-based public keys. Let $\{0,1\}^\bullet$ denote the set of finite binary strings and $\{0,1\}^n$ the set of binary strings of length n. A real-valued function $\epsilon(n)$ is negligible if for every C>0, there exists $n_c>0$ such that $$\varepsilon(n) < 1/n^c$$

for all $n>n_c$. Let q of size at least k and p of size l be primes such that p=rq+1 for some value r co-prime to q. Let g be a generator of a subgroup of $Z^*_p$ of size q. Call this subgroup $G_{p,q}$.

Figure 1:
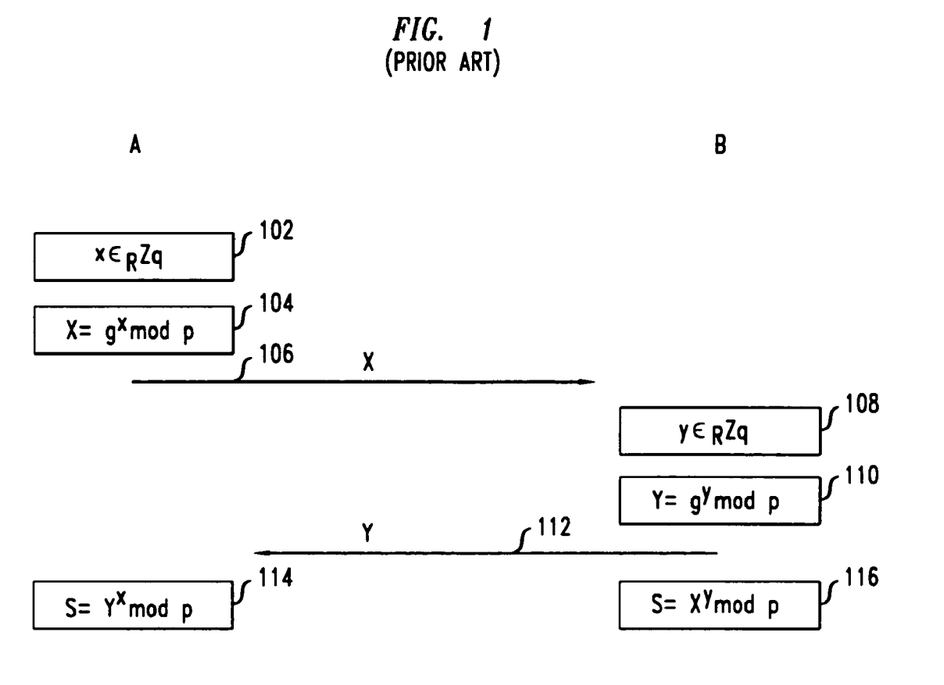
FIG. 1 shows the prior art Diffie-Hellman key exchange protocol.

A key exchange protocol called Diffie-Hellman Key Exchange and described in W. Diffie and M. Hellman, New Directions in Cryptography, IEEE Transactions on Information Theory, vol. 22, no. 6, 644–654, 1976, is based on the modular exponentiation function. Specifically, two parties A and B agree on a secret key in accordance with the protocol described in conjunction with FIG. 1. In step 102 A chooses a random x from the group $Z_q$ where $Z_q=\{0,1,\ldots,q-1\}$ (or simply the integers mod q). In step 104 A computes $X=g^x$ mod p. In step 106, A transmits X to B. In step 108 B chooses a random y from $Z_q$. In step 110 B computes $Y=g^y$ mod p and transmits Y to A in 112. At this point, a shared secret $g^{xy}$ (i.e., a secret key) can be computed by both A and B. (Note that hereinbelow we may ignore the mod p notation for notational simplicity if it is clear that we are working in mod p.) Since $X=g^x$ was transmitted from A to B in step 106, B can calculate the shared secret $g^{xy}$ by computing $X^y$ in step 116. Similarly, since $Y=g^y$ was transmitted from B to A in step 112, A can calculate the shared secret $g^{xy}$ by computing $Y^x$ in step 114. The shared secret S can now be used by A and B as a session key for secure communication.

Diffie-Hellman key exchange can also be performed over other groups in which the discrete log function is difficult to compute, such as certain elliptic curve groups. Groups are well known in the art, as described in I. N. Herstein, Topics in Algebra, $2^{nd}$ edition, John Wiley & Sons, New York, 1975, as follows. A nonempty set of elements G is said to form a group if in G there is defined a binary operation, called the product and denoted by ·, such that 1. a,b∈G implies that a·b∈G (closed).
2. a,b,c,∈G implies that a·(b·c)=(a·b)·c (associative law).
3. There exists an element e∈G such that a·e=e·a=a for all a∈G (the existence of an identity element in G)
4. For every a∈G there exists an element $a^{-1}$∈G such that $a \cdot a^{-1}=a^{-}\cdot a=e$ (the existence of inverses in G).

Thus, more generally, Diffie-Hellman key exchange operates in a specific group where the secret keys x and y are indices to elements of the group. Thus, consider a group G with a group generator g∈G and G={g,g·g,g·g·g,g·g·g·g, . . . } where · is the group operation. As examples, if the group operation for · G is multiplication, then G={$g^1,g^2,g^3,g^4$, . . . }. If the group operation · for G is addition, then G={1g,2g,3g,4g, . . . }. Since the present invention may be implemented using different groups, as used hereinbelow and in the claims, the notation $g^x$ means that the group operation is applied x times on the group generator g. Further, for every group, there is also an inverse group operation represented herein as −. As used hereinbelow and in the claims, the inverse group operation is defined as follows. The inverse group operation on x and y, i.e $$\frac{x}{y},$$

is defined as $x \cdot y^{-1}$.

Figure 2:
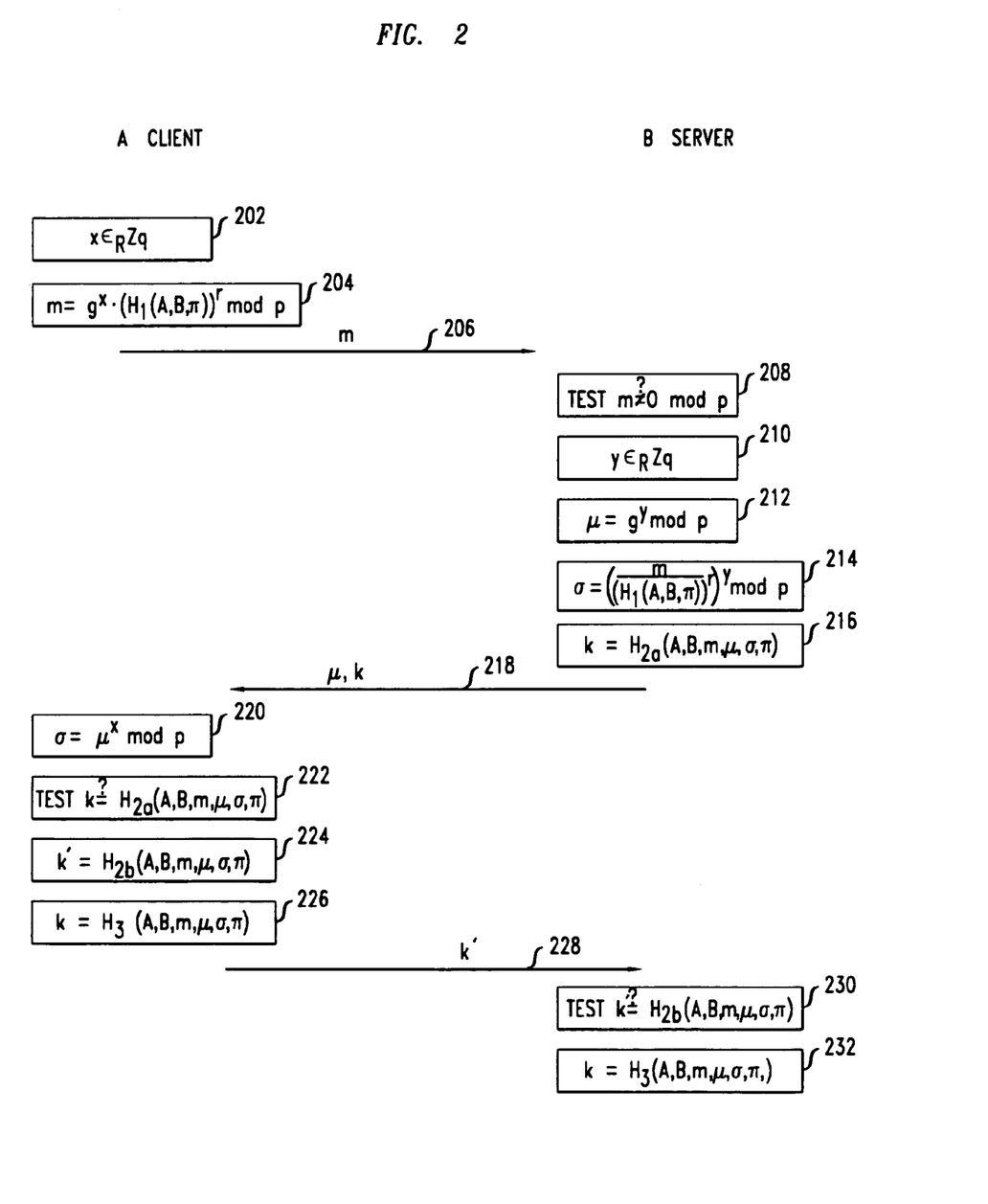
FIG. 2 shows a communication protocol in accordance with an explicit authentication embodiment of the invention in which both parties possess a shared password.

A mutual authentication and key exchange protocol in accordance with a first embodiment of the invention is shown in FIG. 2. Steps shown on the left side of the figure are performed by a first party A, and steps shown on the right side of the figure are performed by a second party B. Typically, A will be a client machine and B will be a server machine. However, this is not required, and A and B are labeled as client and server respectively only as an example to show the typical case, but it is to be understood that the invention is not limited to the case where A and B are client and server, but instead the invention is applicable to any two parties A and B. Arrows represent communication between the parties. In accordance with the protocol, the server will authenticate itself to the client and the client will authenticate itself to the server. After both sides have authenticated, each will generate a secret session key which may be used for subsequent secure communication.

Prior to initiation of the protocol it is assumed that the client and the server are in possession of a password π which the client uses to authenticate with the server.

It is noted that the following protocol authenticates both the server and the client. Thus, neither the server nor the client are assumed to be authentic, and thus either the server or the client may be an adversary. The client may be an adversary attempting to authenticate itself and gain access to the server. The server may be an adversary attempting to spoof another authentic server in an attempt to gain sensitive information from an unsuspecting client.

As would be readily apparent to one of ordinary skill in the art, the server and client may be implemented as programmed computers operating under control of computer program code. The computer program code would be stored in a computer readable medium (e.g. a memory) and the code would be executed by a processor of the computer. Given this disclosure of the invention, one skilled in the art could readily produce appropriate computer program code in order to implement the protocols described herein. The client and server communicate with each other via a data network. Such networked programmed computers are well known in the art and will not be described in further detail herein.

Returning now to FIG. 2, in step 202 the client chooses a random value for the index x from $Z_q$. Then, in step 204 the client computes a parameter m as $m=g^x \cdot (H_1(A,B,\pi))^r \bmod p$, where A is a unique identifier of the client, B is a unique identifier of the server, $\pi$ is the client's password for this particular server, $H_1$ is a random hash function, and represents the group operation. $H_1(A,B,\pi)$ is raised to the r power in order to ensure that the result is within $G_{\{p,q\}}$. Informally, a function H from a set S to a set T will be called a random hash function if the output of H looks random or at least is unpredictable until the function is computed with an input x in S. Since $H_1$ must output something that looks random in $Z^*_p$, it should output |p|+sec bits (where |p| is the number of bits of p and sec is the security parameter. The security parameter may be, for example, 160. Known functions that generally behave this way are SHA-1, described in FIPS 180-1, Secure Hash Standard, Federal Information Processing Standards Publication 180-1, 1995; and RIPEMD-160, described in H. Dobbertin, A. Bosselaers, B. Preneel, *RIPEMD-160: a strengthened version of RIPEMD*, In Fast Software Encryption, 3rd Intl. Workshop, 71–82, 1996.

The tuple $(A,B,\pi)$ is used, rather than only the password, in order to ensure that it is unique for each client-server pair. The password alone is all that seems to be required for heuristic security, but, as discussed in further detail below, the client and server names seem to be necessary for a formal proof of security. Thus, in accordance with an aspect of the invention, a function of at least the password is combined with the Diffie-Hellman value $g^x$ by performing the group operation on the function of at least the password and the Diffie-Hellman value $g^x$. This is an important step of the protocol as it ensures that the Diffie-Hellman value $g^x$ may only be extracted from the parameter m by someone who has knowledge of the password. This extraction of the Diffie-Hellman value $g^x$ will be described in further detail below in conjunction with step 214. In step 206 the client transmits the parameter m to the server.

Upon receipt of the parameter m, the server tests the parameter value in step 208 to ensure that the value is not 0mod p. If the value is 0mod p, the server terminates the protocol because 0 is not in $Z^*_p$. Otherwise, in step 210, the server chooses a random value for the index y from $Z_q$. In step 212 the server assigns a parameter $\mu$ the Diffie-Hellman value $g^y$. Next, in step 214, the server computes the Diffie-Hellman shared secret $g^{xy}$ (referred to as $\sigma$ in this protocol) using the received parameter m as follows:

$$\sigma = \left(\frac{m}{(H_1(A,B,\pi))^r}\right)^y \bmod p.$$

mod p. We will now describe this step in further detail (leaving out the mod p notation for notational simplicity). First, it should be recalled that, as described above, for every group operation, there is an inverse group operation such that the inverse group operation on x and y, i.e.

$$\frac{x}{y},$$

is defined as $x \cdot y^{-1}$. Thus one skilled in the art would recognize that the calculation of $$\frac{m}{(H_1(A,B,\pi))^r}$$

in step 214 is performing the inverse group operation on m and the function of at least the password. Substituting the value of m from step 204, we have $$\frac{g^x \cdot (H_1(A,B,\pi))^r}{(H_1(A,B,\pi))^r} = g^x.$$

Thus, if the server has possession of the correct password $\pi$, then the server can extract the Diffie Hellman value $g^x$ from the value of the received parameter m. Thus, the computation in step 214 will result in the server generating the Diffie-Hellman shared secret $g^{xy}$.

Next, in step 216, the server computes $k=H_{2a}(A,B,m,\mu,\sigma,\pi)$, where $H_{2a}$ is another random hash function which must output sec bits, where sec is the security parameter. The parameter k will be used by the client A, as described below, to authenticate that the server is in possession of the correct password. In step 218 the server transmits parameters $\mu$ and k to the client.

Upon receipt of parameters $\mu$ and k, the client computes $\sigma=\mu^x \bmod p$ in step 220. Since $\mu=g^y$, $\mu^x=g^{xy}$, which is the Diffie-Hellman shared secret. In step 222 the client computes $H_{2a}(A,B,m,\mu,\sigma,\pi)$ using its own knowledge of $\pi$ and tests whether the result is equal to the parameter k received from the server in step 218. If they are the same, then the client has authenticated the server. If they are not the same, then the client terminates the protocol as the server has not authenticated itself. In step 224, the client computes $k=H_{2b}(A,B,m,\mu,\sigma,\pi)$ which will be used by the server to authenticate the client as described below. In step 226 the client generates session key K as $K=H_3(A,B,m,\mu,\sigma,\pi)$. In step 228 the client transmits k' to the server. Again, $H_{2b}$ and $H_3$ are random hash functions which must output sec bits, where sec is the security parameter.

In step 230 the server computes $H_{2b}(A,B,m,\mu,\sigma,\pi)$ using its own knowledge of $\pi$ and tests whether the result is equal to the parameter k' received from the client in step 228. If they are the same, then the server has authenticated the client. If they are not the same, then the server terminates the protocol as the client has not authenticated itself. In step 232 the server generates session key K as $K=H_3(A,B,m,\mu,\sigma,\pi)$.

At this point, both the client and server have authenticated with each other, and both the client and the server have generated the same secure session key K, which may be used for subsequent secure communication between the client and the server.

Figure 3:
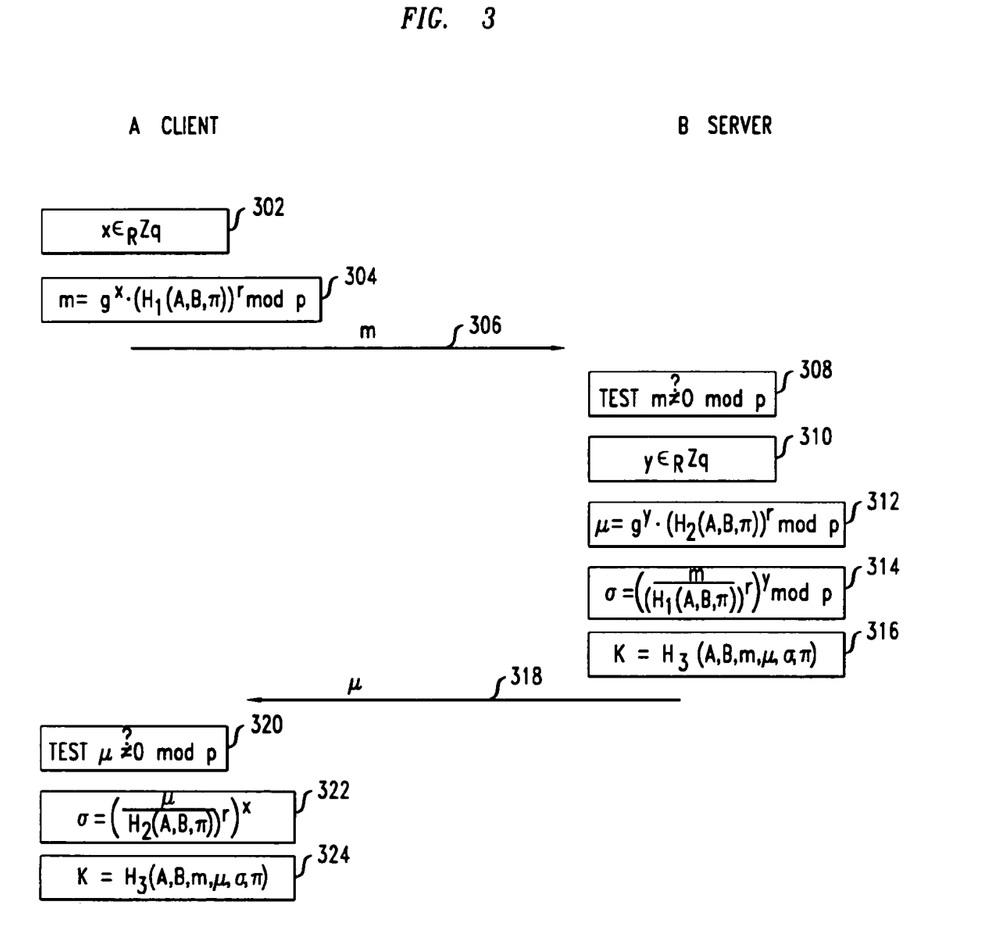
FIG. 3 shows a communication protocol in accordance with an implicit authentication embodiment of the invention in which both parties possess a shared password.

A second embodiment of the invention will now be described in conjunction with FIG. 3. In this embodiment, the authentication between the parties is implicit, which means that there are no steps taken by either party to explicitly authenticate the other party. Rather, each party attempts to generate the session key, but if either party does not have the appropriate password, then that party will be unable to generate the correct session key and communication between the parties will not be possible. Referring now to FIG. 3, steps 302 through 310 correspond to steps 202 through 210 of FIG. 2. In step 312 the server computes parameter $\mu$ as $\mu=g^y\cdot(H_2(A,B,\pi))^r$ mod p, which is similar to step 204 described above in conjunction with FIG. 2. As described above in conjunction with step 204, in effect, step 312 results in combining a function of at least the password with the Diffie-Hellman value $g^y$ by performing the group operation on the function of at least the password and the Diffie-Hellman value $g^y$.

Next, in step 314, the server extracts the Diffie-Hellman value $g^x$ and computes the Diffie-Hellman shared secret $g^{xy}$ as described above in conjunction with step 214. In step 316, the server computes session key K as $K=H_3(A,B,m,\mu,\sigma,\pi)$. In step 318 the server transmits parameter $\mu$, generated in step 312, to the client.

Upon receipt of parameter $\mu$, in step 320 the client tests the parameter $\mu$ value to ensure that the value is not 0mod p. If the value is 0mod p, the client terminates the protocol. Otherwise, in step 322, using the value of $\mu$, the client extracts the Diffie-Hellman value $g^y$ and computes the Diffie-Hellman shared secret $g^{xy}$ as described above. In step 324, the client computes session key K as $K=H_3(A,B,m,\mu,\sigma,\pi)$.

At this point, both the client and the server have generated the session key K based on their knowledge of the password. If both the client and the server were in possession of the correct password, then both will have generated the same session key K, which they may use for secure communication. However, if either one of the parties was not in possession of the correct password, then that party will not have generated the correct session key and communication between the parties will not be possible.

Figure 4:
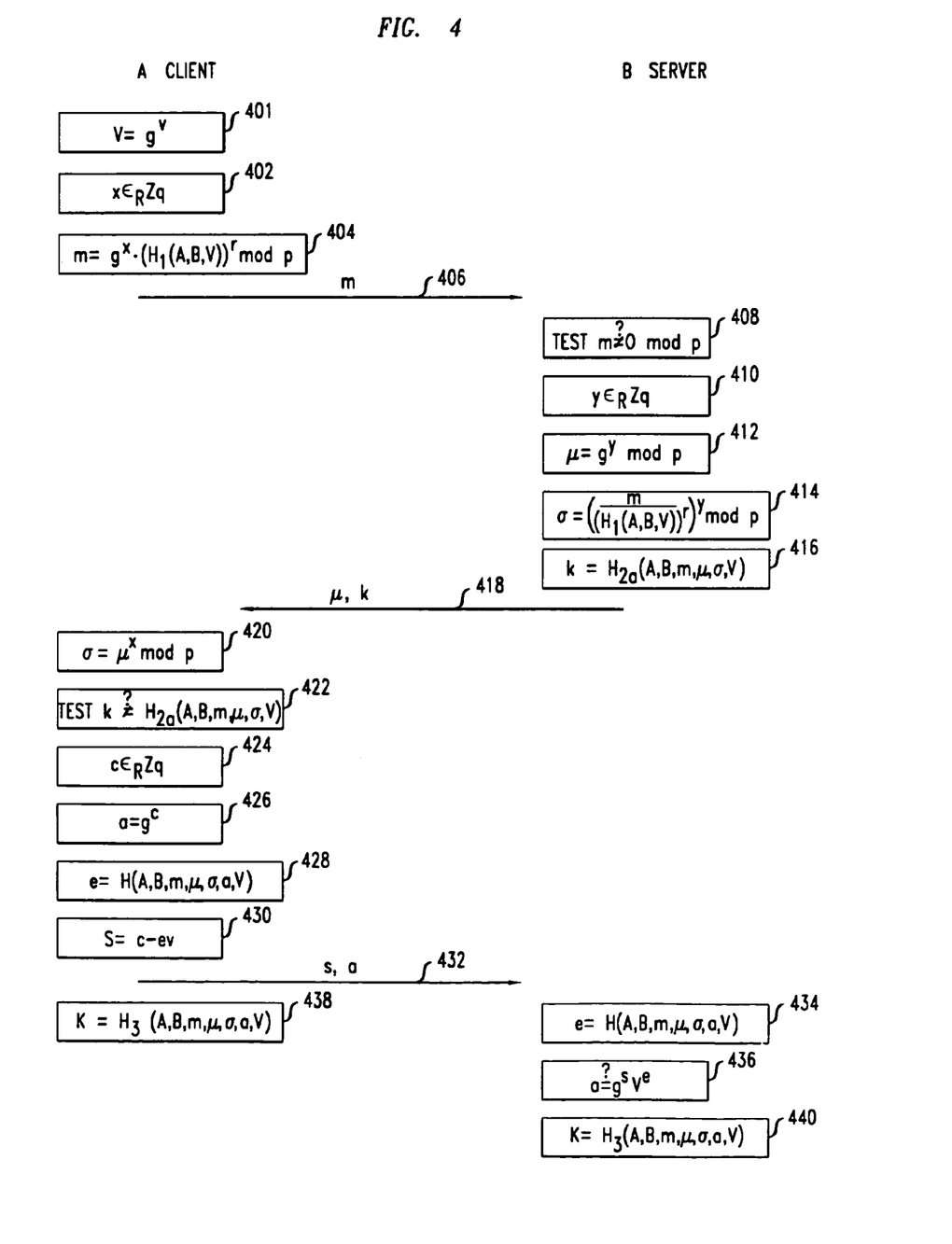
FIG. 4 shows a communication protocol in accordance with an explicit authentication embodiment of the invention in which one party possesses a password and the other party possesses a password verifier.

The protocols described in conjunction with FIGS. 2 and 3 assumed that the server possessed and stored the password $\pi$. One potential problem with such protocols is that a security compromise of server storage may allow an adversary to obtain the passwords of clients. In order to protect against such an occurrence, we now describe another embodiment of the invention in which the server does not possess the password $\pi r$, but instead stores a so-called password verifier V. As used herein, a password verifier is a value which may be computed as a function of the password, but the password cannot be determined from knowledge of the password verifier. In the embodiments described herein, the password verifier V is a function of the password $\pi$, where $V=g^v$ and $v=H_0(A,B,\pi)$ for a particular client A and server B, where $H_0$ is a random hash function which must output $|q|+sec$ bits. Since the client knows $\pi$, the client can compute $v=H_0(A,B,\pi)$ and then from v can compute the verifier $V=g^v$. The server only knows V, and cannot compute v (which is the discrete log of V. The protocol in accordance with this embodiment of the invention is shown in FIG. 4. First, in step 401, the client generates the password verifier V as described above. Steps 402 through 422 then proceed as described above in conjunction with steps 202 through 222, except in steps 402 through 422 the password verifier V is substituted for the password $\pi$. At this point, if the test in step 422 is true, then the client has authenticated that the server knows the correct password verifier V and now the client must authenticate itself to the server by proving that it knows the correct password.

In step 424 the client chooses a random value for the index c from $Z_q$. The client computes $a=g^c$ in step 426 and computes $e=H(A,B,m,\mu,\sigma,a,V)$ in step 428. Next, in step 430, the client computes $S=c-ev$. In step 432 the client transmits S and a to the server. Upon receipt of S and a, in step 434 the server computes $e=H(A,B,m,\mu,\sigma,a,V)$ using its knowledge of V. In step 436, the server computes $g^sV^e$.

If the value computed by the server in step 436 matches the value of a received from the client in step 432, then the server accepts the client as authentic. Finally, the client and the server compute the session key as $K=H_3(A,B,m,\mu,\sigma,a,V)$ in steps 438 and 440 respectively.

Intuitively, the test in step 436 will authenticate the client as follows. Referring to the server's calculation in step 436 of $a=g^sV^e$, since $V=g^v$, the computation in step 436 becomes $a=g^s(g^v)^e=g^sg^{ev}=g^{s+ev}=g^c$, because from step 430 it is seen that $c=s+ev$. Thus, if the server's computation of a matches the a received from the client in step 432, the server knows that the client has knowledge of v, which the client could have computed only with knowledge of the password $\pi$.

Figure 5:
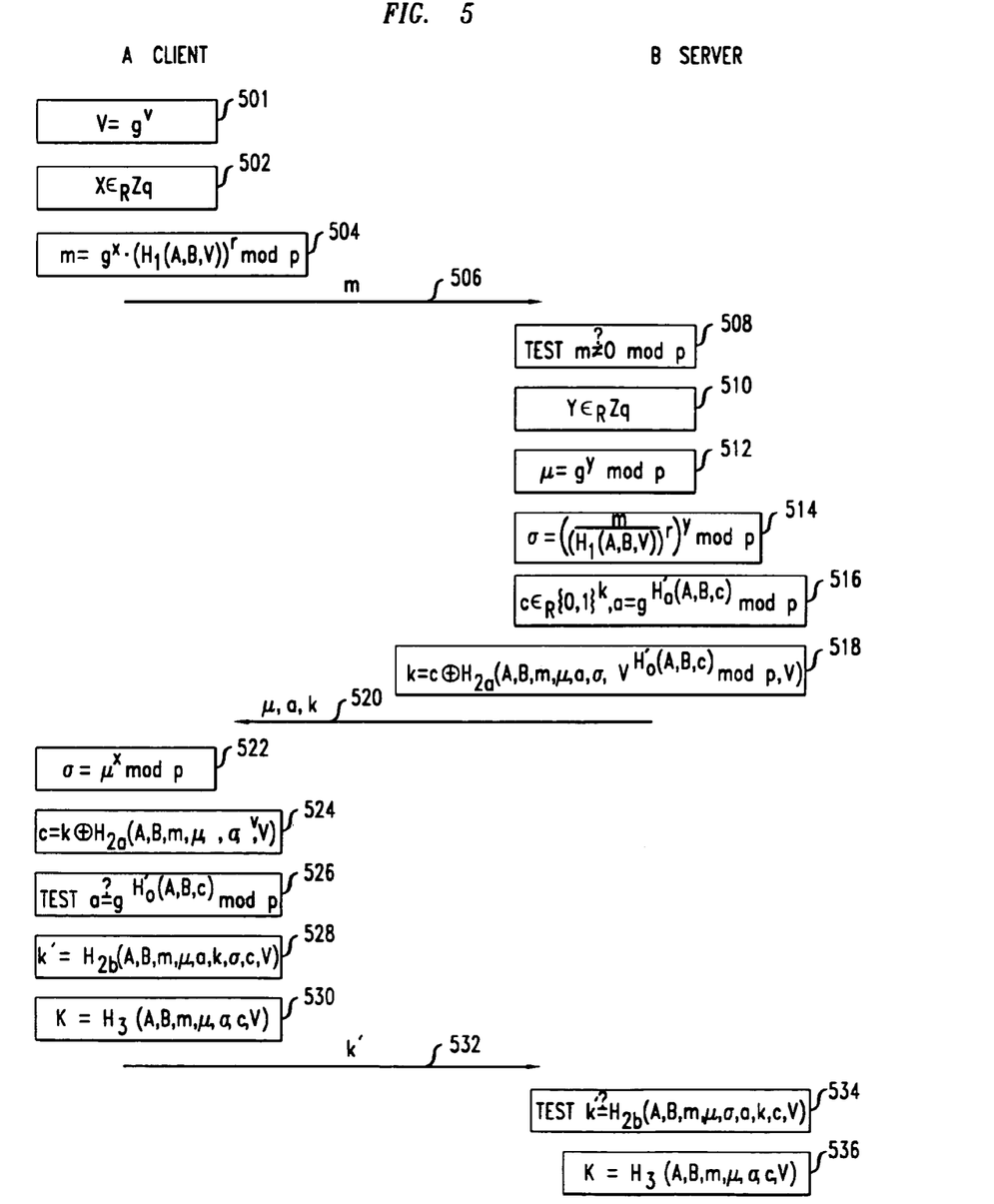
FIG. 5 shows a communication protocol in accordance with another explicit authentication embodiment of the invention in which one party possesses a password and the other party possesses a password verifier.

Another embodiment of the invention is shown in FIG. 5, which also shows a protocol in which the server does not possess the password $\pi$, but instead stores a password verifier V. Steps 501 through 514 are the same as steps 401 through 414 described above in conjunction with FIG. 4. In step 516, the server chooses a random c from $Z_q$ and computes a as follows: $c\varepsilon_r\{0,1\}^k$, $a=g^{H_0'(A,B,c)}$ mod p, where $H_0'$ is a random hash function, which must output $|q|+sec$ bits. In step 518, the server computes $k=c\oplus H_{2a}(A,B,m,\mu,a,\sigma,V^{H_0'(A,B,c)}$ mod p, V), where $\oplus$ represents exclusive or (XOR). In step 520 the server transmits $\mu$, a, k to the client. Upon receipt of $\mu$, a, k, the client computes $\sigma=\mu^x$ mod p in step 522. At this point, the client and the server both possess the shared secret $\sigma$. In step 524 the client computes $c=k\oplus H_{2a}(A,B,m,\mu,a,\sigma,a^v,V)$. In step 526 the client computes $g^{H_0'(A,B,c)}$ mod p and tests whether the computed value is the same as the value of a received from the server in step 520. If they are not the same, then the server has not properly authenticated itself with the client and the client terminates the protocol. If the computed a is the same as the value of a received from the server in step 520, then the client determines that the server is authentic and continues with step 528 of the protocol and calculates $k'=H_{2b}(A,B,m,\mu,a,k,c,V)$. In step 530 the client computes the session key $K=H_3(A,B,m,\mu,\sigma,c,V)$. In step 532 the client transmits k' to the server. In step 534 the server computes $H_{2b}(A,B,m,\mu,\sigma,a,k,c,V)$ and determines whether the computed value is the same as the k' value received from the client in step 532. If they are not the same, then the client has not authenticated itself with the server and the server terminates the protocol. If the computed k' is the same as the value of k' received from the client in step 532, then the server determines that the client is authentic and continues with step 536 of the protocol and calculates the session key $K=H_3(A,B,m,\mu,\sigma,c,V)$.

Intuitively, the authentication of the client and server is based on El Gamal encryption, which will be described only briefly here, but is described in further detail in T. ElGamal, *A Public Key Cryptosystem and a Signature Scheme Based on Discrete Logarithms*, IEEE Transactions on Information Theory, IT-31, 4, pp. 469–472, 1985. In general, a message M is encrypted in accordance with El Gamal encryption as $E(M)=(g^r, y^rM)$, where r is a random value, y is the public key, x is the private key, and $y=g^x$. An encryption (A, B) is decrypted as $$D(A, B) = \frac{B}{A^x}.$$

Substituting values, we have $$\frac{B}{A^x} = \frac{y^r M}{g^{rx}} = \frac{g^{xr}M}{g^{rx}} = M.$$

Thus, in order to decrypt a message encrypted using the El Gamal technique, the secret key is required. In a second version of El Gamal encryption, a message M is encrypted as $E(M)=(g^r, H(y^r) \oplus (M))$, where r is a random value, y is the public key, x is the private key, and $y=g^x$. An encryption (A, B) is decrypted in accordance with this second technique as $D(A,B)=H(A^x) \oplus B$. Substituting values, we have $H(A^x) \oplus H(y^r) \oplus M = H(y^r) \oplus H(y^r) \oplus M = M$. Thus, once again, in order to decrypt a message encrypted using the El Gamal second technique, the secret key is required.

Now we define a "self-certifying El Gamal encryption", in which the second version of El Gamal is used, but with $r=H'(M)$, a random hash of the value being decrypted, instead of just a purely random value. Then when a party receives an encryption (A,B) and decrypts it to get M, that party can test whether $A=g^{H'(M)}$. Note that every (A,B) defines an encryption of something, but the self certification verifies that the encryptor knows exactly what was encrypted, and thus what encryption key was being used.

Referring now to the protocol shown in FIG. 5, one skilled in the art will recognize that steps 516 and 518 are performing a self-certifying El Gamal encryption, with the message being encrypted being a random value c, and where the public key is the password verifier V and the secret key is v. The encryption value is assigned to the parameter k. In step 524 the client decrypts the encrypted k received from the server to extract c, and then performs the test of step 526. If this test is true, then it certifies that the server is in possession of the correct password verifier V. In step 528 the client uses the computed value of c to generate k' and transmits k' to the server in step 532. If the server's test in step 534 is true, then that certifies that the client is in possession of the correct v because only with the secret key v can the client perform the decryption and obtain the c that is input to the hash function used in computing k.

In yet other embodiments of the invention, the protocol shown in FIG. 2 may be modified such that the server does not store the password π, but instead stores the value $(H_1(A, B, \pi))^r$. This does not require any additional computation and has the advantage that a naïve user who uses π with two servers $B_1$ and $B_2$ is not trivially vulnerable on $B_2$ if $B_1$ is compromised.

The inventors have proven that a mutual authentication and key exchange protocol in accordance with the present invention is secure. An outline of the intuition of the proof follows. Intuitively, we must prove:

(1) Two parties that share a password and follow the protocol will authenticate each other and result with a long shared secret.

(2) Assuming the Diffie-Hellman protocol is secure, our protocol is as secure as an "ideal-world protocol" with a trusted party, in which two honest parties can open connections to each other and have the trusted party generate a long shared secret for them to secure the connection, but in which an adversary may also query the trusted party for the shared password once per open connection (before it is secured). (Intuitively, this models the adversary making a random guess at a password and attempting to authenticate himself)

Part (1) is obvious from inspection of the protocol.

Part (2) is more difficult. We show that we can simulate the real protocol without knowing the passwords, but only using the trusted party in the ideal world, and such that an adversary attacking our simulation is indistinguishable from an adversary attacking the real protocol in the real world. (This is a well-known cryptographic proof technique, the "multi-party simulatability" technique as described in D. Beaver, *Secure Multiparty Protocols and Zero-Knowledge ProofSystems Tolerating a Faulty Minority*, Journal of Cryptology, 4(2), pages 75–122, 1991.)

Technically, our model assumes that all hash functions are completely random, and thus whenever the functions are used, the simulator may see the inputs, and set the outputs (as long as these outputs are set in a random way).

The general idea of our simulator is to simply fake the long shared secrets between two honest parties communicating to each other, and then to try to detect guesses on the password (by examining the adversary's hash function queries) on all other conversations, turning them into "test password" queries to the trusted party. The difficult part of this is to show that the adversary may not make more than one password guess per open connection. To show this, we show that if the adversary could, then we could solve the Diffie-Hellman problem. (Specifically, we could take values X, Y, Z $\in$ G, with $X=g^x$, and $Y=g^y$ (for unknown x and y) and determine whether $Z=g^{xy}$.)

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, in the protocols described above, certain parameters are used in evaluating the hash functions. It is noted that not all of the parameters are required for heuristic security, but the additional parameters allow the protocols to be formally proven secure. For example, steps 216, 222, 224, 230, 226 and 232 of the protocol shown in FIG. 2, steps 316 and 324 of the protocol shown in FIG. 3, steps 416, 422, 438 and 440 of the protocol shown in FIG. 4, and steps 530 and 536 of the protocol shown in FIG. 5 seem to require only the parameter a in the hash functions to make the protocol heuristically secure. However, the use of the additional parameters shown and described above allows the protocols to be formally proven secure. Similarly, steps 428 and 434 of the protocol shown in FIG. 4 seem to require only the parameters a and a in the hash functions to make the protocol heuristically secure. However, the use of the additional parameters shown and described above allows the protocol to be formally proven secure. Similarly, steps 518 and 524 of the protocol shown in FIG. 5 seem to require only the parameters σ, a, and $V^{H_0}_{(A,B,c)}$ to make the protocol heuristically secure. However, the use of the additional parameters shown and described above allows the protocol to be formally proven secure. Finally, steps 528 and 534 of the protocol shown in FIG. 5 seem to require only the parameters Cr and c in the hash functions to make the protocol heuristically secure. However, once again, the use of the additional parameters shown and described above allows the protocol to be formally proven secure.

We claim:
1. A method for communication via a data network, between two parties that share a password, using a Diffie-Hellman type key exchange on a particular group to generate a shared secret $g^{xy}$, where g is the group generator known to both parties and x is an index known to one party and y is an index known to the other party, said group having a group operation and an inverse group operation, said method comprising the steps of:
one party generating a parameter m by performing the group operation on $g^x$ and a function of at least said password, and transmitting m to the other party, whereby the other party may perform the inverse group operation on m and said function of at least said password to extract $g^x$ and further calculate said shared secret $g^{xy}$.
2. The method of claim 1 wherein said one party is a client and said other party is a server.
3. The method of claim 1 further comprising the step of:
said one party receiving $g^y$ from said other party and generating said shared secret $g^{xy}$.
4. The method of claim 3 further comprising the step of:
said one party authenticating said other party by comparing a received value against a function of at least one of an identifier of said one party, an identifier of said other party, m, $g^y$, the shared secret, and the password.
5. The method of claim 3 further comprising the step of:
said one party transmitting a function of at least one of an identifier of said one party, an identifier of said other party m, $g^y$, the shared secret, and the password, to said other party whereby the other party may authenticate said one party.
6. The method of claim 3 further comprising the step of:
said one party generating a session key as a function of a least one of an identifier of said one party, an identifier of said other party, m, $g^y$, the shared secret, and the password.
7. The method of claim 1 further comprising the steps of:
said one party receiving a parameter μ from said other party where μ was calculated by the other party by performing the group operation on $g^y$ and a function of at least the password;
said one party performing the inverse group operation on μ and said function of at least the password to extract $g^y$; and
said one party calculating said shared secret $g^{xy}$.
8. The method of claim 7 further comprising the step of:
said one party generating a session key as a function of at least one of an identifier of said one party, an identifier of said other party, m, μ, the shared secret, and the password.
9. A method for communication between two parties over a data network using a Diffie-Hellman type key exchange on a particular group to generate a shared secret $g^{xy}$, where g is the group generator known to both parties, x is an index known to one party, and y is an index known to the other party, said group having a group operation and an inverse group operation, said method comprising the steps of:
one party generating a parameter m by performing the group operation on $g^x$ and a function of at least a password verifier, and transmitting m to the other party, whereby the other party may perform the inverse group operation on m and said function of at least said password verifier to extract $g^x$ and further calculate said shared secret $g^{xy}$.
10. The method of claim 9 wherein said one party is a client and said other party is a server.

11. The method of claim 9 further comprising the steps of:
said one party receiving $g^y$ from said other party and generating said shared secret $g^{xy}$.
12. The method of claim 11 further comprising the step of:
said one party authenticating said other party by comparing a received value against a function of at least one of an identifier of said one party, an identifier of said other party, m, $g^y$, the shared secret, and the password verifier.
13. The method of claim 12 further comprising the steps of:
said one party computing $g^c$, where c is an index known to said one party;
said one party computing a parameter e as a function of at least $g^c$ and at least one of an identifier of said one party, an identifier of said other party, m, $g^y$, the shared secret, and the password verifier;
said one party computing a parameter S as S=c−ev, where v is the discrete log of the password verifier; and
said one party transmitting S and $g^c$ to said other party, whereby said other party may authenticate said first party based at least in part on said values of S and $g^c$.
14. The method of claim 13 further comprising the step of:
said one party generating a session key as a function of a least one of an identifier of said one party, an identifier of said other party, m, $g^y$, the shared secret, $g^c$ and the password verifier.
15. The method of claim 11 further comprising the step of:
said one party transmitting a function of at least one of an identifier of said one party, an identifier of said other party, m, $g^y$, the shared secret, said random value, and the password verifier to said other party whereby the other party may authenticate said one party.
16. The method of claim 11 further comprising the steps of:
said one party authenticating said other party based on self-certifying El Gamal encryption in which a random value is encrypted using the password verifier as the public key and the discrete log of the password verifier as the secret key.
17. The method of claim 16 further comprising the step of:
said one party generating a session key as a function of a least one of an identifier of said one party, an identifier of said other party, m, $g^y$, the shared secret, said random value, and the password verifier.
18. A method for communication via a data network, between two parties that share a password, using a Diffie-Hellman type key exchange on a particular group to generate a shared secret $g^{xy}$, where g is the group generator known to both parties and y is an index known to one party and x is an index known to the other party, said group having a group operation and an inverse group operation, said method comprising the steps of:
said one party receiving a parameter m from said other party, where m was computed by the other party by performing the group operation on $g^x$ and a function of at least said password; and
said one party performing the inverse group operation on m and said function of at least said password to extract $g^x$ and further calculate said shared secret $g^{xy}$.
19. The method of claim 18 wherein said one party stores said password.
20. The method of claim 18 wherein said one party stores a value which represents said function of at least said password but said one party does not store said password.
21. The method of claim 18 wherein said one party is a server and said other party is a client.

22. The method of claim 18 further comprising the step of:
said one party transmitting to said other party a function of at least one of an identifier of said one party, an identifier of said other party, m, $g^y$, the shared secret, and the password.

23. The method of claim 18 further comprising the step of:
said one party authenticating said other party by comparing a received value against a function of at least one of an identifier of said one party, an identifier of said other party, m, $g^y$, the shared secret, and the password.

24. The method of claim 18 further comprising the step of:
said one party generating a session key as a function of a least one of an identifier of said one party, an identifier of said other party, m, $g^y$, the shared secret, and the password.

25. The method of claim 18 further comprising the step of:
said one party generating a parameter μ by performing the group operation on $g^y$ and a function of at least said password, and transmitting μ to the other party, whereby the other party may perform the inverse group operation on μ and said function of at least said password to extract $g^y$ and further calculate said shared secret $g^{xy}$.

26. A method for communication between two parties over a data network using a Diffie-Hellman type key exchange on a particular group to generate a shared secret $g^{xy}$, where g is the group generator known to both parties, y is an index known to one party, and x is an index known to the other party, said group having a group operation and an inverse group operation, said method comprising the steps of:
said one party receiving a parameter m from said other party, where m was computed by the other party by performing the group operation on $g^x$ and a function of at least a password verifier; and
said one party performing the inverse group operation on m and said function of at least said password verifier to extract $g^x$ and further calculate said shared secret $g^{xy}$.

27. The method of claim 26 wherein said one party is a server and said other party is a client.

28. The method of claim 26 further comprising the step of:
said one party transmitting to said other party a function of at least one of an identifier of said one party, an identifier of said other party, m, $g^y$, the shared secret, and the password verifier.

29. The method of claim 26 further comprising the steps of:
said one party authenticating said other party based at least in part on values of parameters S and $g^c$ received from said other party,
wherein,
c is a random value;
S=c−ev, where v is the discrete log of the password verifier; and
e is a function of at least $g^c$ and at least one of an identifier of said one party, an identifier of said other party, m, $g^y$, the shared secret, and the password verifier.

30. The method of claim 29 further comprising the step of:
said one party generating a session key as a function of a least one of an identifier of said one party, an identifier of said other party, m, $g_y$, the shared secret, $g_c$ and the password verifier.

31. The method of claim 26 further comprising the steps of:
said one party encrypting a random value using self-certifying El Gamal encryption using the password verifier as the public key and the discrete log of the password verifier as the secret key; and
transmitting said encrypted random value to said other party.

32. The method of claim 26 further comprising the step of:
said one party authenticating said other party based on a received value which was computed by said other party as a function of at least one of an identifier of said one party, an identifier of said other party, m, $g^y$, the shared secret, said random value, and the password verifier.

33. The method of claim 26 further comprising the step of:
said one party generating a session key as a function of a least one of an identifier of said one party, an identifier of said other party, m, $g^y$, the shared secret, said random value, and the password verifier.

* * * * *